United States Patent Office 3,458,523
Patented July 29, 1969

3,458,523
2-(2 - FUROYL)CYCLOALKANONES, 2 - FURYL-2-(HETEROCYCLICAMINO) CYCLOALKYL KETONES, AND d-(2 - FURYL)-2-HETEROCYCLIC-AMINO-CYCLOHEXANEMETHANOLS
Jacob Szmuszkovicz, Kalamazoo, Mich., assignor to The Upjohn Company, Kalamazoo, Mich., a corporation of Delaware
No Drawing. Filed Aug. 15, 1966, Ser. No. 572,204
Int. Cl. C07d 99/04; A61k 27/00
U.S. Cl. 260—294.7          8 Claims

ABSTRACT OF THE DISCLOSURE 1,3-amino alcohols having anti-depressive action of the formula:

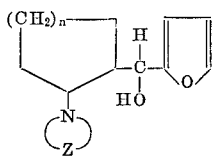

wherein $n$ is 1 to 4 inclusive;

is a heterocyclicamino radical, is produced by treating an enamine

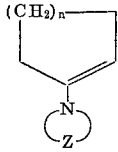

with 2-furoyl chloride, followed by hydrolysis and treatment with a heterocyclicamine

The compounds are useful per se in the medico-veterinary field, as well as in the form of various salts for agricultural or industrial uses, e.g., pickling inhibitor, mothproofing, herbicides.

---

This invention relates to new organic compounds and is particularly concerned with new 1,3-amino alcohols (V), the intermediate ketones (II) and (IV), and to a process for the production thereof.

The novel compounds and the process of invention can be illustratively represented by the following formulae:

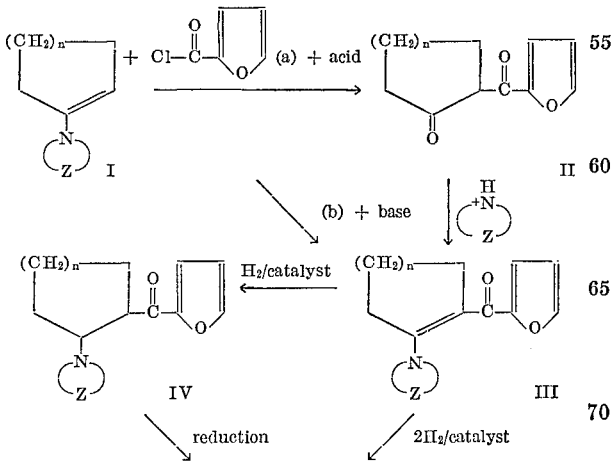

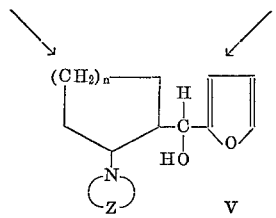

V wherein $n$ has the value of 1 to 4, inclusive; wherein

is selected from the group of heterocyclicamino radicals consisting of pyrrolidino, piperidino, morpholino, 4-methylpiperazino and hexahydro-1H-azepin-1-yl(hexamethyleneimino).

The invention further includes the compounds of Formulae IV and V when in the form of inorganic and organic acid addition salts. In particular this invention embraces the pharmaceutically acceptable acid addition salts of IV and V.

Examples of the cycloalkyl radical illustratively represented by the formula:

are cyclopentyl, cyclohexyl, cycloheptyl, and cyclooctyl.

The process of the present invention comprises: treating a selected enamine (I) with 2-furoyl chloride followed by acid hydrolysis to give the corresponding 2-(2-furoyl) cycloalkanone II; treating II with a heterocyclicamine

wherein

is defined as above, to obtain the 1,3-amino ketone III, a 2-furyl 2-heterocyclicamino-1-cycloalken-1-yl ketone; and catalytically hydrogenating III with 2 molar equivalents of hydrogen to obtain the alcohol V, an α-(2-furyl)-2-(heterocyclicamino)cycloalkanemethanol.

The catalytic hydrogenation of III can also be carried out with 1 molar equivalent of hydrogen to give the intermediate 1,3-amino ketone IV, a 2-furyl 2-(heterocyclicamino)cycloalkyl ketone, which is reduced with another molar equivalent of hydrogen to give the alcohol V.

Alternatively, compound III can be prepared in one step by avoiding hydrolysis after the addition of 2-furoyl chloride to the enamine. The hydrogen chloride liberated in the reaction between the enamine (I) and the 2-furoyl chloride is neutralized by addition of a base (capable of accepting hydrogen chloride without reacting with the acid chloride) to the reaction mixture. It is also necessary to avoid the presence of water in the reaction mixture to prevent hydrolysis of compound III.

The amino function in compounds of Formulae IV and V furthermore permits the transformation of these compounds by neutralization with inorganic and organic acids, into acid addition salts such as the hydrochloride, hydrobromide, hydriodide, sulfate, phosphate, perchlorate, pamoate, cyclohexanesulfamate, methanesulfonate, ethanesulfonate, p-toluenesulfonate, benzenesulfonate, trichloroacetate, trifluoroacetate, tartrate, citrate, lactate and the like.

The novel 1,3-amino alcohols V and the pharmaceutically acceptable acid addition salts thereof possess pseudocholinesterase inhibitory activity and stimulate the central nervous system. These compounds may be administered to mammals and birds by both oral and parenteral routes in order to produce their pharmacological effects. For oral administration, the new compounds of Formula V, as well as the pharmaceutically acceptable acid addition salts, can be compounded into solid and liquid dosage forms, such as tablets, capsules, powders, granules, syrups, elixirs and the like, containing the appropriate amounts for treatment. For tablets, common pharmaceutically acceptable carriers are used such as starch, lactose, kaolin, dicalcium phosphate and the like. These compounds and the pharmaceutically acceptable acid addition salts of V can also be given as powders, particularly in gelatin capsules with or without carriers such as methylcellulose, magnesium stearate, talc and the like. For fluid preparations, these compounds may be dissolved or suspended in aqueous alcoholic vehicles with or without buffering agents and flavoring mixtures.

The thus-obtained pharmaceutical formulations are administered, e.g., to depressed animals such as domestic pet animals which have been transferred from one owner to another.

Certain acid addition salts of compounds of Formulae IV and V can also be used for purposes completely different from those in the medical-veterinary field. For example, the fluosilicates of compounds of Formulae IV and V are useful mothproofing agents according to U.S. Patents 1,915,334 and 2,075,359. The thiocyanic acid addition salts of the same compounds can be condensed with formaldehyde to form resinous polymers, which according to U.S. Patents 2,425,320 and 2,606,155 are useful as pickling inhibitors. The trichloroacetic acid addition salts of the compounds of Formulae IV and V are useful as herbicides, for example, against Johnson grass, yellow foxtail, green foxtail, Bermula grass and quack grass.

The starting materials of Formula 1 are produced as shown in "Advances in Organic Chemistry: Methods and Results," vol. 4, pages 1–113, Interscience Publishers, New York, N.Y., 1963.

In carrying out the process of the present invention, the selected starting material of Formula I is dissolved in a suitable organic solvent such as methylene chloride, chloroform, ethylene dichloride or the like, and the solution is cooled to a temperature between $-5°$ and $10°$ C. To this solution is added under continuous cooling the 2-furoyl chloride, usually in solution in the same solvent. The addition is carried out dropwise, keeping the temperature generally below $10-15°$ C. After all of the 2-furoyl chloride has been added the mixture is stirred over a period of 2 to 48 hours, generally at room temperature.

The mixture is thereupon decomposed by the addition of an aqueous mineral acid such as hydrochloric, hydrobromic, sulfuric or the like. The thus-obtained keto compound (II) is isolated from the reaction mixture by conventional means, usually extraction, and can be purified by conventional means such as distillation, recrystallization, chromatography, or the like.

The compound of Formula II is converted to the 1,3-amino ketone (III) by treating the compound with a selected heterocyclic amine such as piperidine, pyrrolidine, morpholine, 1-methylpiperazine, or hexamethyleneimine, usually in an organic solvent such as benzene, toluene, methanol or the like in the presence of an acidic catalyst such as benzenesulfonic acid, p-toluenesulfonic acid, ethylbenzenesulfonic acid or the like. The reaction is generally carried out at an elevated temperature such as the reflux temperature of the mixture, under conditions for removing water from the reaction mixture, such as by the use of an azeotropic separator and preferably in a nitrogen atmosphere. The desired product is isolated in conventional manner such as by evaporating the reaction mixture to dryness.

The catalytic hydrogenation of compound III is generally carried out in the presence of a noble metal catalyst, such as palladium on charcoal or platinum oxide, at a hydrogen pressure between 40 and 60 pounds per square inch. If the hydrogenation is carried out with absorption of 1 molar equivalent of hydrogen, a keto compound of Formula IV is obtained. When 2 molar equivalents of hydrogen are absorbed, an alcohol of Formula V is obtained. Catalytic hydrogenation of the keto compound of Formula IV also gives the 1,3-amino alcohol of Formula V. The keto compound of Formula IV can also be reduced to the 1,3-amino alcohol of Formula V by means of chemical reducing agents such as lithium aluminum hydride or alkali metal borohydrides, e.g., sodium borohydride, potassium borohydride, and lithium borohydride, and the like.

As an alternate procedure, the reaction of the enamine I with 2-furoyl chloride can be carried out in an organic solvent such as chloroform, methylene chloride, ethylene dichloride or the like in the presence of a base capable of absorbing hydrogen chloride but not capable of reacting with the 2-furoyl chloride. Bases of this nature are preferably trialkylamines such as triethylamine, tripropylamine, tributylamine, or the like. The reaction when carried out in this manner is performed at low temperature, preferably between $0-10°$ C. The trialkylamine when reacting with hydrogen chloride yields trialkylamine hydrochloride, which is insoluble in the organic solvent, and can be removed from the reaction mixture by filtration. The product is obtained by evaporating the solution remaining after the filtration. The product, 1,3-amino ketone III, is used for the hydrogenation, usually without further purification.

The following examples are illustrative of the process and products of the present invention, but are not to be construed as limiting.

EXAMPLE 1

2-(2-furoyl)cyclohexanone

A mixture of 289 g. (2.95 moles) of cyclohexanone and 419 g. (5.9 moles) of pyrrolidine was refluxed in 4500 ml. of benzene in a flask equipped with an azeotropic separator. After the water formed during the reaction was collected, the solution was evaporated in dryness in vacuo, and the resulting crude oil, consisting of 1-pyrrolidino-1-cyclohexene, was used as such for the next step without further purification.

The total 1-pyrrolidino-1-cyclohexene, as obtained above, was dissolved in 1260 ml. of chloroform. The reaction mixture was cooled to $5°$ C. and thereto was added under constant stirring and cooling 153 g. (1.18 moles) of 2-furoyl chloride in 480 ml. of chloroform. The addition was carried out dropwise over a period of 90 minutes, keeping the reaction mixture below $10°$ C. After the addition was completed, the mixture was stirred for about 20 hours at room temperature. Thereupon was added 1800 ml. of 10% hydrochloric acid over a period of 20 minutes, while keeping the reaction mixture at a temperature below $35°$ C. After the addition of hydrochloric acid was terminated, the reaction mixture was stirred for 2 hours. The organic layer was separated from the aqueous acidic layer and the aqueous acidic layer was extracted three times with 250 ml. portions of chloroform. The chloroform extracts and original organic layer were combined, washed successively with water, saturated aqueous sodium bicarbonate solution, water and saturated salt solution, and was dried by passage through anhydrous sodium sulfate. The dried solution was evaporated and the resulting crude brown oil was crystallized from 300 ml. of methanol to give a total of 126 g. (56% yield) of 2-(2-furoyl)cyclohexanone. Two recrystallizations from methanol gave 2-(2-furoyl)-cyclohexanone in pale yellow rods of melting point $113-114.5°$ C. Ultraviolet: $\lambda_{max.}$ 228 (1,500); 284 (5,700); 340 (16,750).

*Analysis.*—Calcd. for $C_{11}H_{12}O_3$: C, 68.73; H, 6.29. Found: C, 68.90; H, 6.49.

EXAMPLE 2

*2-(2-furoyl)cyclopentanone*

In the manner given in Example 1, 1 - pyrrolidino - 1-cyclopentene was reacted with 2-furoyl chloride to give 2-(2-furoyl)-cyclopentanone.

EXAMPLE 3

*2-(2-furoyl)cycloheptanone*

In the manner given in Example 1, 1-piperidino-1-cycloheptene was reacted with 2-furoyl chloride to give 2-(2-furoyl)-cycloheptanone.

EXAMPLE 4

*2-(2-furoyl)cyclooctanone*

In the manner given in Example 1, 1-pyrrolidino-1-cyclooctene was reacted with 2-furoyl chloride to give 2-(2-furoyl)cyclooctanone.

EXAMPLE 5

*2-furyl 2-piperidino-1-cyclohexen-1-yl ketone*

A mixture consisting of 22.9 g. (0.12 mole) of 2-(2-furoyl)cyclohexanone, 30.6 g. (0.36 mole) of piperidine, 960 ml. of toluene, and 0.8 g. of p-toluenesulfonic acid was refluxed for 23 hours under nitrogen using an azeotropic separator. The mixture was thereupon evaporated to dryness to give 2-furyl 2-piperidino-1-cyclohexen-1-yl ketone.

EXAMPLE 6

*2-furyl 2-morpholino-1-cyclohexen-1-yl ketone*

In the manner given in Example 5, a mixture of 2-(2-furoyl)cyclohexanone, morpholine, benzene and p-toluenesulfonic acid was refluxed under nitrogen for a period of 26 hours. The reaction mixture was evaporated to dryness to give 2-furyl 2 - morpholino - 1 - cyclohexen-1-yl ketone.

EXAMPLE 7

*2-furyl 2-(4-methyl-1-piperazinyl)-1-cyclohexen-1-yl ketone*

A mixture of 0.03 mole of 2-(2-furoyl)cyclohexanone, 0.09 mole of N-methylpiperazine, 250 ml. of toluene and 0.2 g. of p-toluenesulfonic acid was refluxed in a nitrogen atmosphere for a period of 7 hours. After 7 hours the theoretical amount of water had been collected in an azeotropic separator. The reaction mixture was thereupon evaporated to dryness to give 2-furyl 2-(4-methyl-1-piperazinyl)-1-cyclohexen-1-yl ketone.

EXAMPLE 8

*2-furyl 2-(hexahydro-1H-azepin-1-yl)-1-cyclohexen-1-yl ketone*

In the manner given in Example 5, 2-(2-furoyl)cyclohexanone was reacted with hexamethyleneimine in the presence of p-toluenesulfonic acid to give 2-furyl 2-(hexahydro-1H-azepin-1-yl)-1-cyclohexen-1-yl ketone.

EXAMPLE 9

*2-furyl 2-pyrrolidino-1-cyclohexen-1-yl ketone*

In the manner given in Example 5, 2-(2-furoyl)cyclohexanone was reacted with pyrrolidine in the presence of p-toluenesulfonic acid to give 2-furyl 2 - pyrrolidino-1-cyclohexen-1-yl ketone.

EXAMPLE 10

*2-furyl 2-piperidino-1-cyclopenten-1-yl ketone*

In the manner given in Example 5, 2-(2-furoyl)cyclopentanone was reacted with piperidine in the presence of p-toluenesulfonic acid to give 2-furyl 2-piperidino-1-cyclopenten-1-yl ketone.

EXAMPLE 11

*2-furyl-2-piperidino-1-cyclohepten-1-yl ketone*

In the manner given in Example 5, 2-(2-furoyl)cycloheptanone was reacted with piperidine in the presence of p-toluenesulfonic acid to give 2-furyl 2-piperidino-1-cyclohepten-1-yl ketone.

EXAMPLE 12

*2-furyl 2-piperidino-1-cycloocten-1-yl ketone*

In the manner given in Example 5, 2-(2-furoyl)cyclooctanone was reacted with piperidine in the presence of p-toluenesulfonic acid to give 2-furyl 2-piperidino-1-cycloocten-1-yl ketone.

In the manner given in Example 5, other 2-furyl 2-heterocyclicamino-1-cycloalken-1-yl ketones (III) can be prepared by reacting selected 2-(2-furoyl)cycloalkanones (II) with heterocyclic amines in the presence of an acid catalyst such as a benzenesulfonic acid. Representative compounds thus obtained include: 2-furyl 2-morpholino-1-cyclopenten - 1-yl ketone; 2-furyl 2-pyrrolidino-1-cyclopenten-1-yl ketone; 2-furyl 2-(4-methyl-1-piperazinyl)-1-cyclopenten-1-yl ketone; 2-furyl 2-(hexahydro-1H-azepin-1-yl)-1-cyclopenten-1-yl ketone; 2-furyl 2-pyrrolidino-1-cyclohepten - 1-yl ketone; 2-furyl 2-morpholino-1-cyclohepten-1-yl ketone; 2-furyl 2-(4-methyl-1-piperazinyl)-1-cyclohepten-1-yl ketone; 2-furyl 2-pyrrolidino-1-cycloocten-1-yl ketone; 2-furyl 2-morpholino-1-cycloocten-1-yl ketone; 2-furyl 2-(hexahydro-1H-azepin-1-yl)-1-cycloocten-1-yl ketone; and the like.

EXAMPLE 13

*α-(2-furyl)-2-piperidinocyclohexanemethanol and its hydrochloride*

A solution of 4.5 g. of 2-furyl 2-piperidino-1-cyclohexen-1-yl ketone in 50 ml. ethanol was hydrogenated in the presence of 0.15 g. of platinum oxide catalyst at an initial pressure of 50.1 pounds of hydrogen. Two molar equivalents of hydrogen were taken up during 4 hours. The mixture was filtered through a filter aid and evaporated to dryness. The oily residue was dissolved in ether and 10% aqueous hydrochloric acid was added. The thus-obtained reaction mixture was stirred for 0.5 hour. A suspension was obtained which was filtered, yielding a solid which was washed with ether and then twice recrystallized from methanol to give α-(2-furyl)-2-piperidinocyclohexanemethanol hydrochloride.

An aqueous solution of α-(2-furyl)-2-piperidinocyclohexanemethanol hydrochloride was treated with a 10% aqueous solution of sodium hydroxide. The mixture was extracted with methylene chloride, the extracts washed with water, dried and evaporated to give an oily residue. This residue was three times crystallized from methanol to give the free base, α-(2-furyl)-2-piperidinocyclohexanemethanol.

EXAMPLE 14

*α-(2-furyl)-2-pyrrolidinocyclohexanemethanol and its hydrochloride*

In the manner given in Example 13, 2-furyl-2-pyrrolidino-1-cyclohexen-1-yl ketone was hydrogenated in the presence of platinum oxide at about 50 pounds of hydrogen pressure until 2 molar equivalents of hydrogen were absorbed. The resulting product was treated with hydrochloric acid to give α-(2-furyl)-2-pyrrolidinocyclohexanemethanol hydrochloride.

Treatment of this acid addition salt with a base gave α-(2-furyl)-2-pyrrolidinocyclohexanemethanol.

EXAMPLE 15

*α-(2-furyl)-2-morpholinocyclohexanemethanol and its hydrochloride*

In the manner given in Example 13, 2-furyl-2-morpholino-1-cyclohexen-1-yl ketone in methanol was hydrogenated in the presence of platinum oxide at about 50 pounds of hydrogen pressure until 2 molar equivalents of hydrogen were absorbed and the resulting product treated with hydrochloric acid to give α-(2-furyl)-2-morpholinocyclohexanemethanol hydrochloride.

Treatment of this acid addition salt with a base gave α-(2-furyl)-2-morpholinocyclohexanemethanol.

EXAMPLE 16

*α-(2-furyl)-2-(hexahydro-1H-azepin-1-yl)cyclohexanemethanol and its hydrochloride*

In the manner given in Example 13, 2-furyl-2-(hexahydro-1H-azepin-1-yl)-1-cyclohexen-1-yl ketone in ethanol was hydrogenated in the presence of platinum oxide at about 50 pounds of hydrogen pressure until 2 molar equivalents of hydrogen were absorbed and the resulting product treated with hydrochloric acid to give α-(2-furyl)-2-(hexahydro-1H-azepin-1 - yl)cyclohexanemethanol hydrochloride.

Treatment of this acid addition salt with a base gave α-(2-furyl)-2-(hexahydro-1H - azepin - 1 - yl)cyclohexanemethanol.

EXAMPLE 17

*α-(2-furyl)-2-(4-methyl-1-piperazinyl)cyclohexanemethanol and its dihydrochloride*

In the manner given in Example 13, 2-furyl-2-(4-methyl-1-piperazinyl)-1-cyclohexen-1-yl ketone in ethanol was hydrogenated in the presence of platinum oxide at about 50 pounds of hydrogen pressure until 2 molar equivalents of hydrogen were absorbed and the resulting product treated with hydrochloric acid to give α-(2-furyl)-2-(4-methyl-1 - piperazinyl)cyclohexanemethanol dihydrochloride.

Treatment of this acid addition salt with a base gave α-(2-furyl)-2-(4 - methyl - 1 - piperazinyl)cyclohexanemethanol.

EXAMPLE 18

*α-2-(furyl)-2-piperidinocyclopentanemethanol and its hydrochloride*

In the manner given in Example 13, 2-furyl-2-piperidino-1-cyclopenten-1-yl ketone in ethanol was hydrogenated in the presence of platinum oxide at about 50 pounds of hydrogen pressure until 2 molar equivalents of hydrogen were absorbed and the resulting product treated with hydrochloric acid to give α-(2-furyl) - 2- piperidinocyclopentanementhanol hydrochloride.

Treatment of this acid addition salt with a base gave α-(2-furyl)-2-piperidinocyclopentanemethanol.

EXAMPLE 19

*α-(2-furyl)-2-piperidinocycloheptanemethanol and its hydrochloride*

In the manner given in Example 13, 2-furyl-2-piperidino-1-cyclohepten-1-yl ketone in ethanol was hydrogenated in the presence of platinum oxide at about 50 pounds of hydrogen pressure until 2 molar equivalents of hydrogen were absorbed and the resulting product treated with hydrochloric acid to give α-(2-furyl)-2-piperidinocycloheptanemethanol hydrochloride.

Treatment of this acid addition salt with a base gave α-(2-furyl)-2-piperidinocycloheptanemethanol.

EXAMPLE 20

*α-(2-furyl)-2-piperidinocyclooctanemethanol and its hydrochloride*

In the manner given in Example 13, 2-furyl-2- piperidino-1-cycloocten-1-yl ketone in ethanol was hydrogenated in the presence of platinum oxide at about 50 pounds of hydrogen pressure until 2 molar equivalent of hydrogen were absorbed and the resulting product treated with hydrochloric acid to give α-2-furyl) - 2 - piperidinocyclooctanemethanol hydrochloride.

Treatment of this acid addition salt with a base gave α-(2-furyl)-2-piperidinocyclooctanemethanol.

In the manner given in Example 13, other α-(2-furyl)-2 - (heterocyliocamino)cycloalkanemethanols (V) and hydrochlorides are obtained by hydrogenating with 2 molar equivalents of hydrogen a 2-furyl 2-heterocyclic-amino-1-cycloalken-1-yl ketone (III) in the presence of a catalyst. Representative alcohols thus obtained include:

α-(2-furyl)-2-pyrrolidinocyclopentanemethanol;
α-(2-furyl)-2-morpholinocyclopentanemethanol;
α-(2-furyl)-2-(4-methyl-1-piperazinyl)cyclopentanemethanol;
α-(2-furyl)-2-(hexahydro-1H-azepin-1-yl)cyclopentanemethanol;
α-(2-furyl)-2-pyrrolidinocycloheptanemethanol;
α-(2-furyl)-2-morpholinocycloheptanemethanol;
α-(2-furyl)-2-(4-methyl-1-piperazinyl)-cycloheptanemethanol;
α-(2-furyl)-2-(hexahydro-1H-azepin-1-yl)cycloheptanemethanol;
α-(2-furyl)-2-pyrrolidinocyclooctanemethanol;
α-(2-furyl)-2-morpholinocyclooctanemethanol;
α-(2-furyl)-2-(4-methyl-1-piperazinyl)cyclooctanemethanol;
α-(2-furyl)-2-(hexahydro-1H-azepin-1-yl)cyclooctanemethanol;

the hydrochlorides thereof and the like.

EXAMPLE 21

*2-furyl 2-piperidinocyclohexyl ketone*

A solution of 0.1 mole of 2-furyl 2-piperidino-1-cyclohexen-1-yl ketone in 300 ml. of ethanol was hydrogenated in the presence of 1.2 g. of platinum oxide at an initial pressure of 50 pounds of hydrogen. After one molar equivalent of hydrogen had been absorbed the hydrogenation was stopped, the reaction mixture filtered to remove the catalyst and the filtrate evaporated to give a residue. This residue was taken up with ether and the solution was extracted with 10% aqueous hydrochloric acid. The aqueous acidic layer was separated, neutralized with aqueous sodium hydroxide, and the mixture extracted three times with methylene chloride. The methylene chloride extracts were combined, several times washed with brine and then water, dried by passage through anhydrous sodium sulfate and evaporated to give 2-furyl 2-piperidinocyclohexyl ketone.

EXAMPLE 22

*2-furyl 2-piperidinocyclopentyl ketone*

In the manner given in Example 21, 2-furyl 2-piperidino-1-cyclopenten-1-yl ketone was hydrogenated with 1 molar equivalent of hydrogen in the presence of platinum oxide to give 2-furyl 2-piperinocyclopentyl ketone.

EXAMPLE 23

*2-furyl 2-piperidinocyclopentyl ketone*

In the manner given in Example 21, 2-furyl 2-piperidino-1-cyclohepten-1-yl ketone was hydrogenated with 1 molar equivalent of hydrogen in the presence of platinum oxide to give 2-furyl 2-piperidinocycloheptyl ketone.

EXAMPLE 24

*2-furyl 2-piperidinocyclooctyl ketone*

In the manner given in Example 21, 2-furyl 2-piperidino-1-cycloocten-1-yl ketone was hydrogenated with 1 molar equivalent of hydrogen in the presence of platinum oxide to give 2-furyl 2-piperidinocyclooctyl ketone.

EXAMPLE 25

*2-furyl 2-pyrrolidinocyclohexyl ketone*

In the manner given in Example 21, 2-furyl 2-pyrrolidino-1-cyclohexen-1-yl ketone was hydrogenated with 1 molar equivalent of hydrogen in the presence of platinum oxide to give 2-furyl 2-pyrrolidinocyclohexyl ketone.

EXAMPLE 26

*2-furyl 2-(hexahydro-1H-azepin-1-yl)cycloheptyl ketone*

In the manner given in Example 21, 2-furyl 2-(hexahydro-1H-azepin-1-yl)-1-cyclohepten-1-yl ketone was hydrogenated with 1 molar equivalent of hydrogen in the presence of platinum oxide to give 2-furyl 2-(hexahydro-1H-azepin-1-yl)cycloheptyl ketone.

EXAMPLE 27

*2-furyl 2-(4-methyl-1-piperazinyl)cyclohexyl ketone*

In the manner given in Example 21, 2-furyl 2-(4-methyl-1-piperazinyl)-1-cyclohexen-1-yl ketone was hydrogenated with 1 molar equivalent of hydrogen in the presence of platinum oxide to give 2-furyl 2-(4-methyl-1-piperazinyl)cyclohexyl ketone.

EXAMPLE 28

*2-furyl 2-morpholinocyclohexyl ketone*

In the manner given in Example 21, 2-furyl 2-morpholino-1-cyclohexen-1-yl ketone was hydrogenated with 1 molar equivalent of hydrogen in the presence of platinum oxide to give 2-furyl 2-morpholinocyclohexyl ketone.

In the manner given in Example 21, other 2-furyl 2-(heterocyclicamino)cycloalkyl ketones (IV) are obtained by partial catalytic hydrogenation of the corresponding 2-furyl 2-(heterocyclicamino)-1-cycloalken-1-yl ketones (III). Representative compounds thus obtained include: 2-furyl 2-pyrrolidinocyclopentyl ketone; 2-furyl 2-(4-methyl-1-piperazinyl)cyclopentyl ketone; 2-furyl 2-(hexahydro-1H-azepin-1-yl)cyclopentyl ketone; 2-furyl 2-morpholinocyclopentyl ketone; 2-furyl 2-pyrrolidinocycloheptyl ketone; 2-furyl 2-morpholinocycloheptyl ketone; 2-furyl 2-pyrrolidinocyclooctyl ketone; 2-furyl 2-morpholinocyclooctyl ketone; 2-furyl 2-(4-methyl-1-piperazinyl)cyclooctyl ketone; and the like.

The saturated ketones of Examples 21 through 28 and in the above list are easily further hydrogenated to the corresponding α-(2-furyl)-2-(heterocyclicamino)cycloalkanemethanols with hydrogen (1 molar equivalent) and platinum oxide as catalyst in ethanol solution. The thus-obtained alcohols correspond to those produced in Examples 13 to 20, including the list of alcohols immediately following Example 20.

EXAMPLE 29

*2-furyl 2-(hexahydro-1H-azepin-1-yl)cyclohexyl ketone hydrochloride*

Triethylamine (10.1 g.; 0.1 mole) was added to a solution of 1-(hexahydro-1H-azepin-1-yl-1-cyclohexene (0.1 mole; 17.9 g.) in 42 ml. of chloroform. The solution was cooled and thereto was added a solution of 0.1 mole (13.1 g.) of 2-furoyl chloride in 40 ml. of chloroform while the temperature was kept between 5–10° C. The resulting suspension was stirred overnight at room temperature; it was then filtered to remove the precipitated triethylamine hydrochloride. The filtrate was evaporated, and the residue was hydrogenated (PtO$_2$) in 300 ml. of ethanol for 2 hours. The reaction mixture was filtered, evaporated to dryness and dissolved in 200 ml. of 10% hydrochloric acid and 200 ml. of ether. The mixture was stirred for 0.5 hour, the aqueous acidic layer was separated, cooled in ice, basified and extracted with four portions of 100 ml. each of methylene chloride. The extracts were combined, washed with water, saturated salt solution, dried by passage through anhydrous sodium sulfate and evaporated to give 28 g. of a brown oil. This oil was dissolved in 200 ml. of ether and acidified with ethereal hydrogen chloride. The ether was decanted. The resulting gummy solid was washed with ether and triturated with 200 ml. of isopropyl alcohol to give a precipitate weighing 7.7 g. (25% yield). This precipitate was crystallized from methanol-ether to give 2-furyl 2-(hexahydro-1H-azepin-1-yl)cyclohexyl ketone hydrochloride of melting point 181–182° C. Ultraviolet: λ$_{max.}$ 227 (2,340); sh 236 (1,840); 277 (15,800).

*Analysis.*—Calcd. for C$_{17}$H$_{25}$NO$_2$·HCl: C, 65.47; H, 8.40; Cl, 11.37; N, 4.50. Found: C, 65.10; H, 8.46; Cl, 11.53; N, 4.57.

EXAMPLE 30

*α-(2-furyl)-2-(hexahydro-1H-azepin-1-yl)cyclohexanemethanol hydrochloride*

A warm solution of 0.93 g. (3 mmoles) of 2-furyl 2-(hexahydro-1H-azepin-1-yl)cyclohexyl ketone hydrochloride in 25 ml. of ethanol was added dropwise, over a period of 10 minutes, to an ice-cooled solution of sodium borohydride (2.0 g.) in 50 ml. of ethanol. The mixture was stirred for a period of 24 hours, evaporated to dryness in vacuo at 50° C. and then 50 ml. of water was added and the mixture extracted thrice with ether. The ether extracts were washed with water, saturated salt solution, dried by passing through anhydrous sodium sulfate and evaporated. The residue was redried in methylene chloride and evaporated. The residual oil, which was thus obtained, was converted to the hydrochloride in ether solution and was then crystallized from 5 ml. of methanol and 100 ml. of ether to give 0.75 g. (80% yiedl) of α-(2-furyl) - 2 - (hexahydro - 1H - azepin - 1 - yl)cyclohexanemethanol hydrochloride of melting point 191–192° C. Ultraviolet: λ$_{max.}$ 216 (8,950).

*Analysis.*—Calcd. for C$_{17}$H$_{27}$NO$_2$·HCl: C, 65.05; H, 8.99; Cl, 11.30; N, 4.46. Found: C, 65.01; H, 8.96; Cl, 11.28; N, 4.66.

In the manner given in Examples 29 and 30, the earlier named α-(2-furyl)-2-heterocyclicamino)cycloalkanemethanols (V) can be prepared by: (1) reacting 2-furoyl chloride with a 1-heterocyclicamino-1-cycloalkene (I) in the presence of a base such as triethylamine to obtain the corresponding 2-furyl 2-heterocyclicamino-1-cycloalken-1-yl ketone (III) which is converted by catalytic hydrogenation to the corresponding saturated ketone of Formula IV, and (2) converting the latter to the corresponding alcohol of Formula V by reduction with sodium borohydride, potassium borohydride, lithium borohydride and the like. In this manner the same alcohols mentioned in Examples 13 to 20 and the list of alcohols immediately following Example 20 can be obtained.

The hydrochlorides of the above alcohols of Formula V and ketones of Formula IV are converted to free bases by treatment of their aqueous solutions with sodium or potassium hydroxide. From these aqueous reaction mixtures, the base of Formulae IV and V are isolated by extraction, for example, with ether, chloroform, methylene chloride, carbon tetrachloride, benzene or the like and evaporation of the solvent.

The ketones (IV) and alcohols (V) as free bases can be treated with the stoichiometrically required amount of an acid, e.g., hydrochloric, hydrobromic, hydriodic, phosphoric, sulfuric, perchloric, trichloroacetic, trifluoroacetic, tartaric, lactic, citric, methanesulfonic, p-toluenesulfonic, benzenesulfonic, p-chlorobenzenesulfonic, and the like, to give the corresponding acid addition salt. Representative acid addition salts comprise the hydrochlorides, hydrobromides, hydriodides, phosphates, sulfates, perchlorates, trichloroacetates, trifluoroacetates, tartrates, lactates, citrates, methanesulfonates, p-toluenesulfonates, benzenesulfonates, p-chlorobenzenesulfonates, and the like of 2-furyl 2-piperidinocyclopentyl ketone; 2-furyl 2-pyrrolidinocyclohexyl ketone; 2-furyl 2-(4-methyl-1-piperazinyl)cycloheptyl ketone; 2-furyl 2-(hexahydro-1H-azepin-1-yl)-cyclooctyl ketone; 2-furyl 2-morpholinocyclopentyl ketone; α-(2-furyl)-2-piperidinocyclohexanemethanol; α(2 - furyl)-2-morpholinocyclopentanemethanol; α-(2-furyl)-2-pyrrolidinocycloheptanemethanol; α-(2-furyl)-2-piperidinocyclooctanemethanol; α-(2-furyl)-2-(hexahydro-1H-azepin-1-yl)cyclopentanemethanol; α-(2-furyl)-2-(4 - methyl - 1 - piperazinyl)cyclohexanemethanol; α-(2-furyl)-2-morpholinocycloheptanemethanol; α-(2-furyl)-2-pyrrolidinocyclooctanemethanol and the like.

I claim:
1. A 2-(2-furoyl)cycloalkanone of the formula:

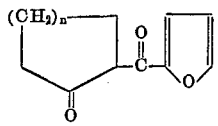

wherein $n$ has the value of 1 to 4, inclusive.

2. 2-(2-furoyl)cyclohexanone.

3. A compound selected from the group consisting of a 2-(heterocyclicamino)cycloalkyl ketone of the formula:

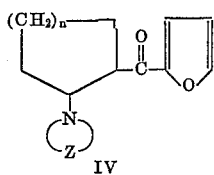

wherein $n$ has the value of 1 to 4, inclusive; wherein

is selected from the group of heterocyclicamino radicals consisting of pyrrolidino, piperidino, morpholino, 4-methylpiperazino and hexahydro-1H-azepin-1-yl, and the acid addition salts thereof.

4. 2-furyl 2-(hexahydro-1H-azepin-1-yl)cyclohexyl ketone hydrochloride.

5. 2-furyl 2-piperidinocyclohexyl ketone.

6. A compound selected from the group consisting of a substituted methanol of the formula:

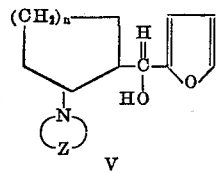

wherein $n$ has the value of 1 to 4, inclusive; wherein

is selected from the group of heterocyclicamino radicals consisting of pyrrolidino, piperidino, morpholino, 4-methylpiperazino and hexahydro-1H-azepin-1-yl and the acid addition salts thereof.

7. α-(2-furyl)-2-piperidinocyclohexanemethanol.

8. α-(2-furyl) - 2 - (hexahydro-1H-azepin-1-yl)cyclohexanemethanol hydrochloride of melting point about 191–192° C.

References Cited

UNITED STATES PATENTS 3,002,976  10/1961  Janssen.

OTHER REFERENCES

Chem. Ber., vol. 90, Nos. 7–12, 1957, Hünig et al., pp. 2833–2840.

Organic Chemistry, Wertheim, 3rd ed., 1951, pp. 175–176.

C. A., vol. 51, January-February 1957, p. 460 c, Lacey.

Advances in Organic Chemistry: Methods and Results, vol. 4, ed. Raphael et al., 1963 by Szmuszkovicz, pp. 10, 11, 47, 48, 98, 101.

HENRY R. JILES, Primary Examiner

S. WINTERS, Assistant Examiner

U.S. Cl. X.R.

260—247.7, 268, 326.5, 347.7, 347.8; 424—248, 250, 267, 274

UNITED STATES PATENT OFFICE
CERTIFICATE OF CORRECTION

Patent No. 3,458,523                     Dated July 29, 1969

Inventor(s) Jacob Szmuszkovicz

It is certified that error appears in the above-identified patent and that said Letters Patent are hereby corrected as shown below:

Column 4, line 42, for "in dryness" read -- to dryness --. Column 7, line 32, for "α-2-(" read -- α-(2 --; line 66, for "equivalent" read -- equivalents --; line 68, for "α-2-" read -- α-(2- --. Column 8, line 11, for "piperazinyl)-cyclo-" read -- piperazinyl)cyclo- --; line 48, for "2-piperinocyclo-" read -- 2-piperidinocyclo- --; line 51, for "2-piperidinocyclopentyl" read -- 2-piperidinocycloheptyl --. Column 9, line 48, for "1-yl-1" read -- 1-yl)-1 --. Column 10, line 22, for "80% yiedl" read -- 80% yield --; line 30, for "-2-heterocyclicamino" read -- -2-(heterocyclicamino --; line 47, for "base" read -- bases --.

SIGNED AND
SEALED
NOV 10 1970

(SEAL)
Attest:

Edward M. Fletcher, Jr.
Attesting Officer

WILLIAM E. SCHUYLER, JR.
Commissioner of Patents